No. 721,348. PATENTED FEB. 24, 1903.
R. WILSON.
WEATHER VANE.
APPLICATION FILED OCT. 14, 1902.
NO MODEL. 4 SHEETS—SHEET 4.

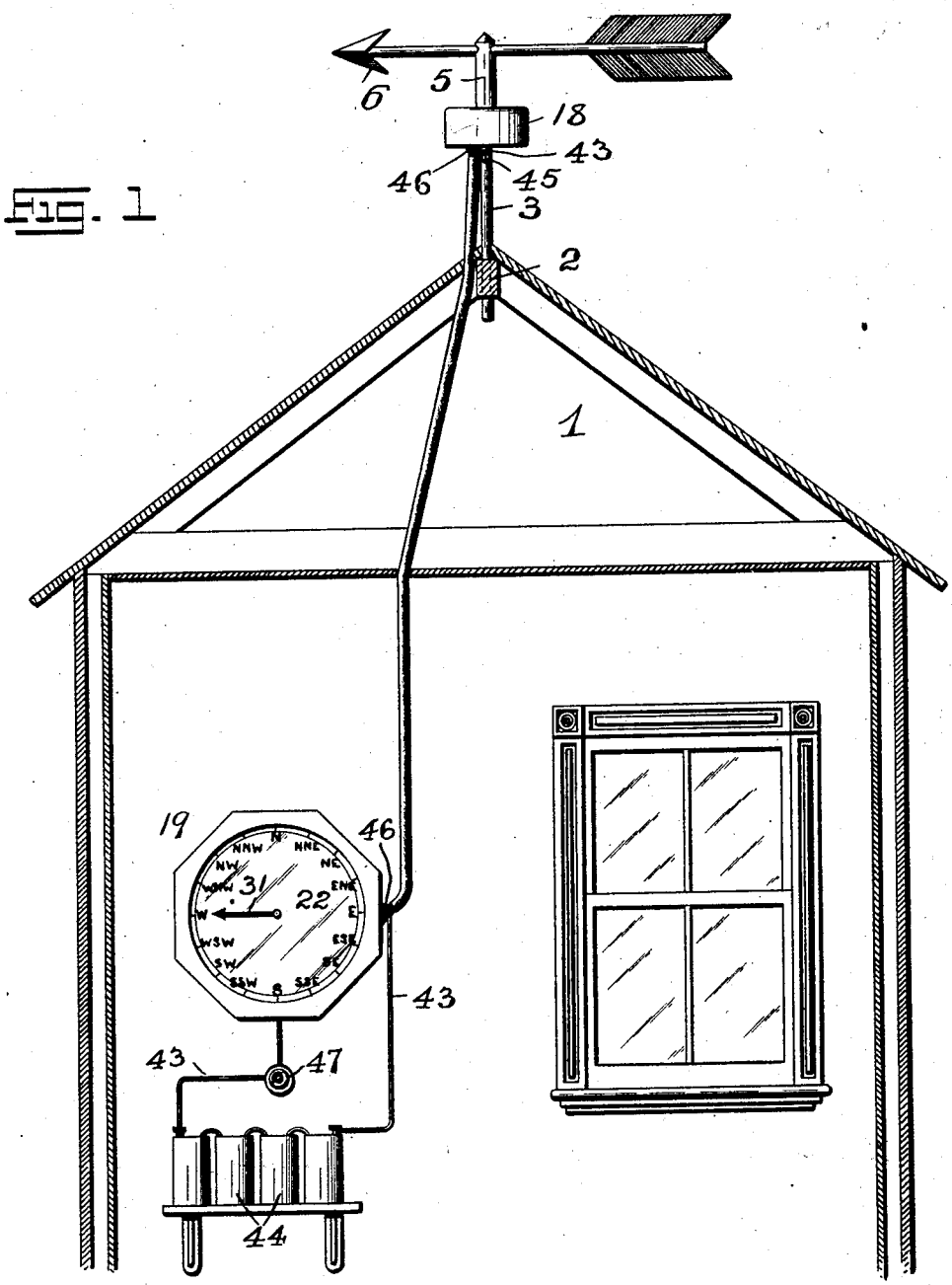

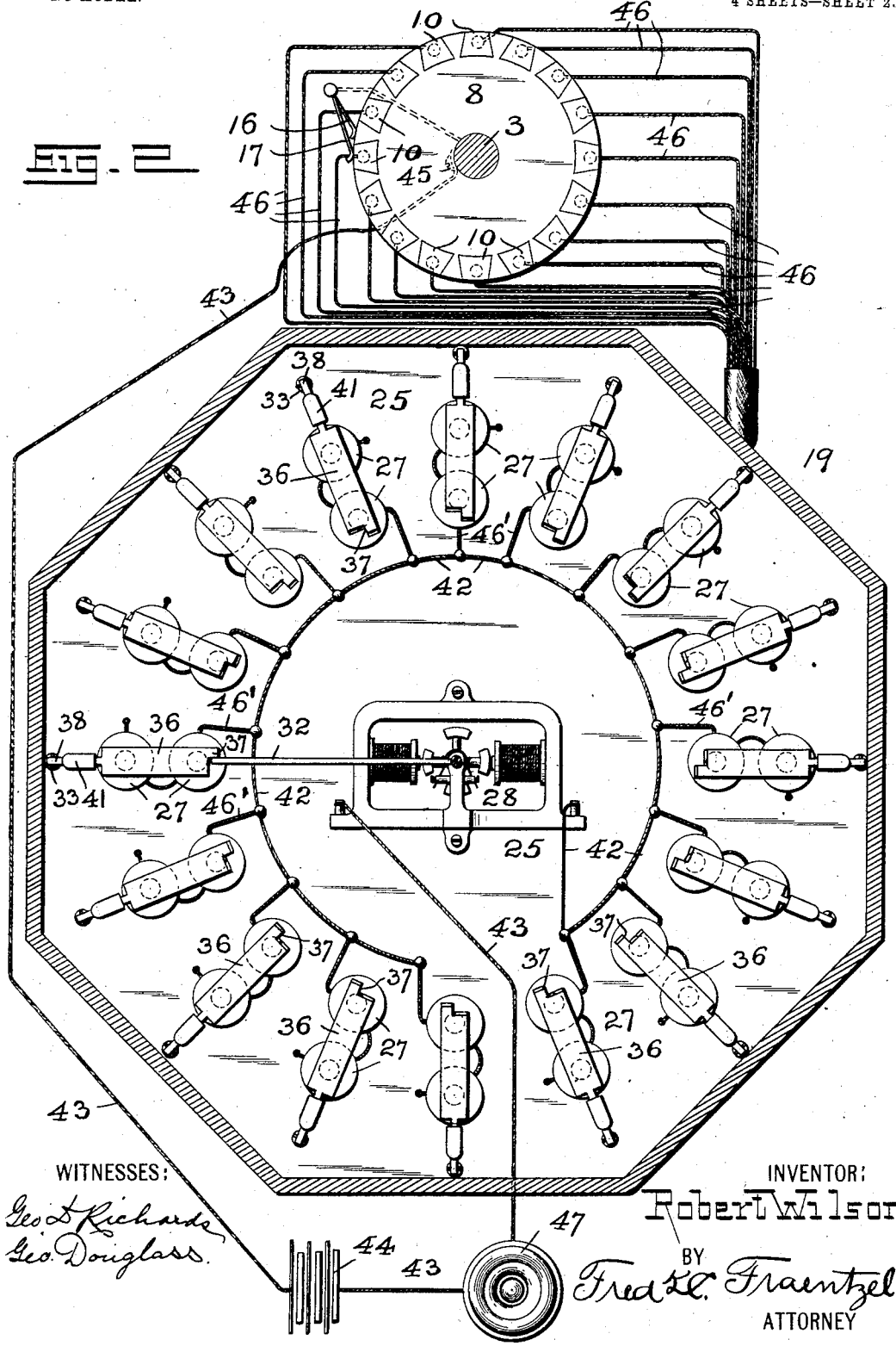

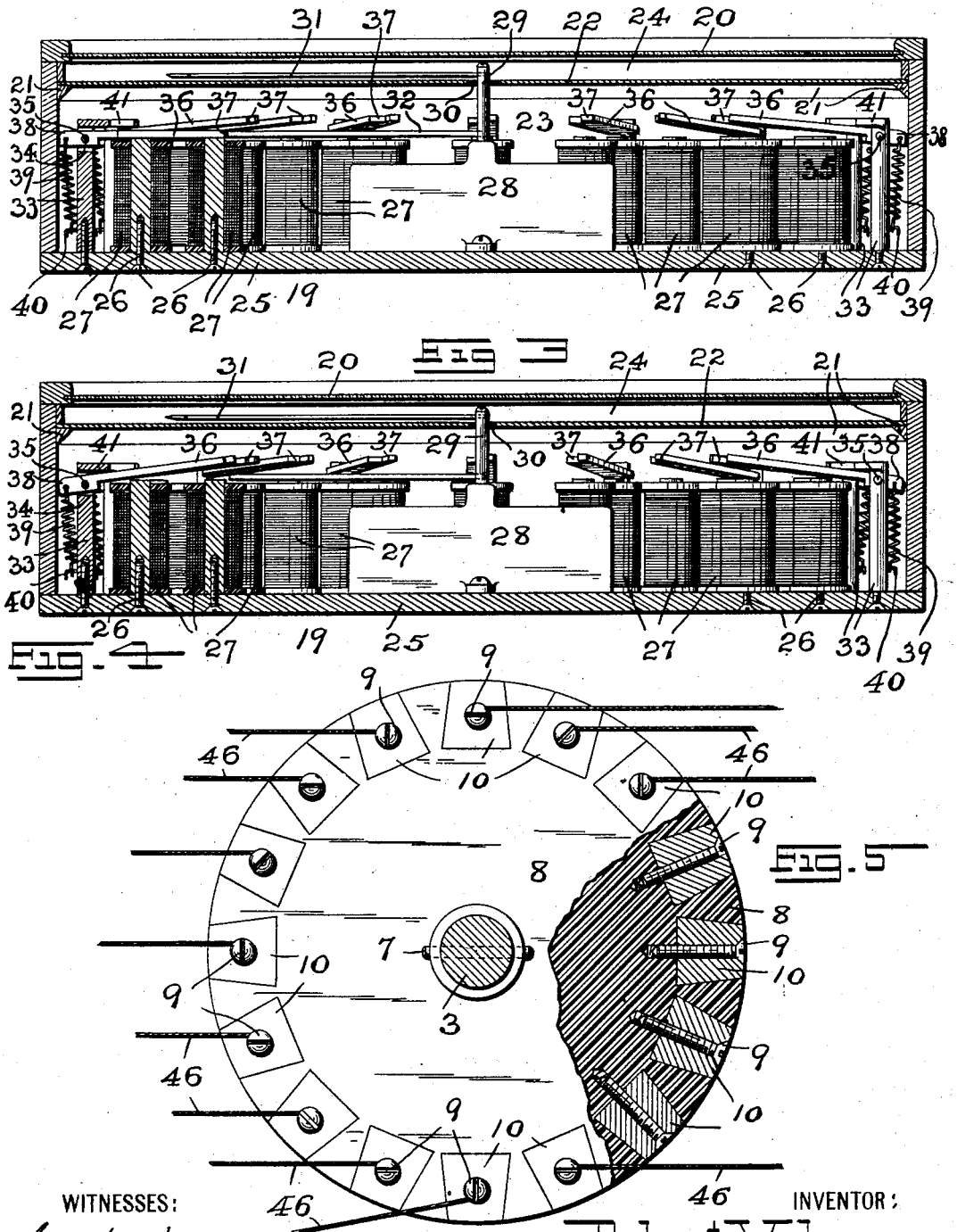

WITNESSES:
Geo. D. Richards
Geo. Douglass

INVENTOR:
Robert Wilson
BY Fred L. C. Fraentzel,
ATTORNEY

UNITED STATES PATENT OFFICE.

ROBERT WILSON, OF NEWARK, NEW JERSEY, ASSIGNOR TO BENJAMIN PLANT AND ALICE J. PLANT, OF NEWARK, NEW JERSEY.

WEATHER-VANE.

SPECIFICATION forming part of Letters Patent No. 721,348, dated February 24, 1903.

Application filed October 14, 1902. Serial No. 127,228. (No model.)

*To all whom it may concern:*

Be it known that I, ROBERT WILSON, a citizen of the United States, residing at Newark, in the county of Essex and State of New Jersey, have invented certain new and useful Improvements in Weather-Vanes; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in weather-vanes; and the invention has for its primary object to provide a novel system and apparatus for the purpose of indicating upon an indicator located at any desired distance from the weather-vane the exact direction of the wind at any time by means of electric circuits controlled from the rotary movement of the said vane.

The invention consists generally in the organization of the following systems of apparatus and electrical circuits for operating the wind-indicating apparatus within a room of a building from a rotating weather-vane stationed upon the outside of the building.

The invention consists, furthermore, in the various novel arrangements and combinations of the devices and parts hereinafter more particularly described, as well as in the details of the construction thereof, all of which will be finally embodied in the clauses of the claim, which form a part of and are appended to the present specification.

The invention is clearly illustrated in the accompanying drawings, in which—

Figure 6:
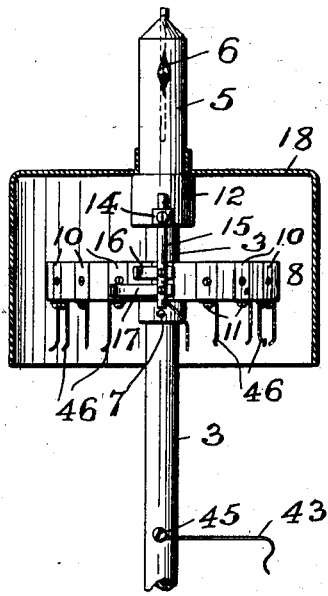
Figure 7:
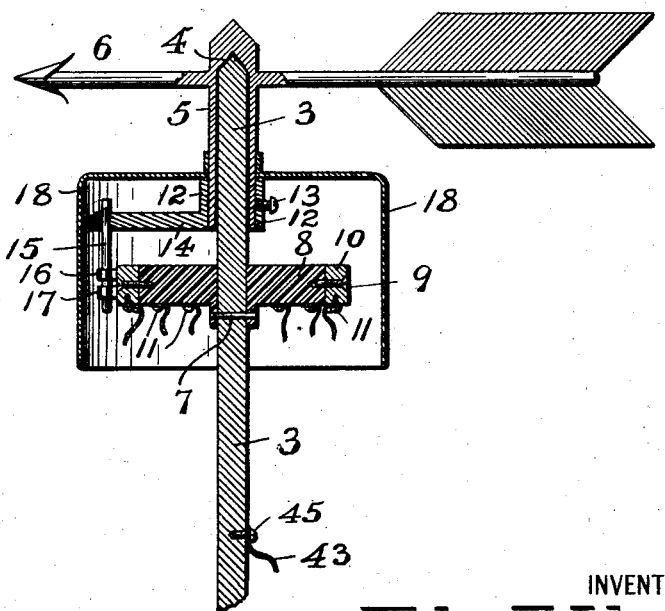

Figure 1 is a sectional representation of a building provided with a rotating weather-vane upon the outside of the building, an indicator within the building, and the electric circuits between the said indicator and a commutator upon the shaft or spindle of the weather-vane. Fig. 2 is a diagrammatic representation of the indicator, commutator, and the system of electric circuits between the said indicator and commutator. Fig. 3 is a transverse vertical section of the electrical indicator, certain parts thereof being represented in elevation and one of the armature-bars being represented in its actuated and held relation with one of the electromagnets of the indicator. Fig. 4 is a similar view of the said electrical indicator, representing the several armatures in their initial and normally raised and inoperative positions. Fig. 5 is a cross-section of the vane-spindle and a commutator thereon, the commutator being represented partly in plan and partly in horizontal section. Fig. 6 is a detail view of the weather-vane, the spindle on which the vane is supported, the commutator, and a protecting-hood, all the parts being represented in elevation except the said hood, which is illustrated in vertical section. Fig. 7 is a vertical section of all the parts represented in said Fig. 6.

Similar characters of reference are employed in all of the said hereinabove-described views to indicate corresponding parts.

Referring to the figures of the drawings, the reference character 1 in Fig. 1 indicates any suitable building, to which is affixed in a beam 2 or in any suitable manner a stem or rod 3. This stem or rod extends above the roof of the building and supports upon its upper end and preferably pointed end 4 a sleeve 5, carrying a horizontally-extending vane 7. This sleeve 5 is arranged to rotate upon the upper end of the said stem or rod 3, as will be clearly evident from an inspection of Fig. 6. Suitably secured upon the said fixed stem or rod 3 and held in a fixed position on said stem or rod by means of a pin 7 or in any other manner is a commutator-disk 8, made of a non-conductor of electricity, such as fiber, porcelain, rubber, or the like. Suitably secured by means of screws 9 or other fastening means in suitably-arranged peripheral slots or openings in the main disk 8 are commutator-sections 10, of copper or other metal which is a good electrical conductor, the number of said sections 10 corresponding to the number of divisions upon the dial of the electrical indicator used with my invention and hereinafter more particularly described. Each commutator-section 10 is provided with a contact post or screw, as 11, to each of which is attached a circuit-wire leading to electromagnets of the said electric indicator in the manner and for the purposes to be presently more particularly set forth. Suitably secured upon the lower portion of the said previously-mentioned sleeve 5 by means of a set-screw 13 is a collar 12, formed with a laterally-extending arm 14 and a post 15, carrying a pair of contact-brushes 16 and 17, which are in sliding contact with the peripheral edge of the fixed commutator-disk 8 and the contact edges of the commutator-sections 10, as clearly illustrated in Fig. 2 of the drawings. To protect the said commutator-disk 8 and its sections 10, as well as the other parts of the device, from rain, snow, and other influences of the weather, I have arranged above these parts, resting directly upon the upper edge of the collar 12, a suitably-constructed hood or casing 18, which may be suitably fixed to the sleeve 5 and rotates with the latter when said sleeve 5 and the arm 14 and brushes 16 and 17 are actuated by the movements of the vane 6.

Referring now to Figs. 1, 2, 3, and 4, the construction of the electric indicator will be clearly evident, the same consisting, essentially, of a suitably-shaped and suitably-constructed box or casing 19, adapted to be secured against the wall or other part of a building. The said box or casing 19 is provided with a glass or other transparent cover 20, and beneath this cover and arranged upon a suitable support, as 21, in said box or case is a dial-plate 22, on which are arranged in any well-known manner the usual symbols of the compass, as illustrated in Fig. 1 of the drawings. The said box or case 19 is thus provided with a lower chamber 23 and an upper chamber 24, separated from each other by the said dial-plate 22. Within the said lower chamber 23 and suitably secured upon the base 25 of the said box or case 19 by means of screws 26 or any other fastening means are a series of electromagnets 27, corresponding in number to the number of symbols upon the face of the dial-plate 22 and to the number of commutator-sections 10 hereinabove mentioned. The electromagnets are arranged on the radii of a circle having its center in the central axis of the armature-shaft 29 of a suitable electric motor 28, also secured upon the said base 25, as clearly illustrated. The said armature-shaft 29 extends in an upward direction through a centrally-disposed opening 30 in the dial-plate 22, being provided with a laterally-extending index-hand or pointer 31, and within the said chamber 23 in alinement with the said index-hand or pointer 31 and secured to the said armature-shaft 29 is a laterally-extending arm or bar 32. It will thus be evident that any rotary movement of the said armature-shaft 29 of the electric motor 27 will produce a corresponding rotary motion of the said arm or bar 32 and said index-hand or pointer 31, the same moving in unison with each other. Directly back of each electromagnet 27 is a post 33, having a bifurcated end portion 34, and oscillating upon a pin 35 in the bifurcated end portion 34 of each post 33 is an armature-bar 36. Each bar 36 is provided at its inner end with an offset 37, forming a stop, for the purposes to be hereinafter set forth, and the outer end portion 38 of each bar 36 has attached thereto the one end of a spring 39, each spring 39 in turn being attached at its lower end to a pin 40 on its respective post 33, as illustrated. Each post 33 is also provided with an arm 41, acting as a stop against which the respective armature-bar 36 is brought by the action of its spring 39 upon its end portion 38 to normally retain the end portion of each bar 36 above the offset 37 in a raised position and permit the rotary movement of the free end of the previously-mentioned arm or bar 32 beneath the said offsets 37 without interference when the electric motor is set in operation until the free end portion of the arm or bar 32 is brought in contact with one of the said offsets 37 of an armature-bar 36 which has been attracted by one of the electromagnets, as indicated in Fig. 3, substantially in the manner and for the purposes to be presently described.

Having thus described the general construction of the various devices and apparatus employed with my invention, I will now set forth the general arrangement of the electric circuits in which these devices and apparatus are arranged.

Referring to Fig. 2, it will be seen that the electric motor 28 is placed in the circuit-wires 42 and 43, the circuit-wire 43 being connected with the respective poles of an electric battery 44 or other source of electrical energy and the wire 43 terminating at and being affixed to the stem or rod 3 by means of a screw 45 or other means for making electrical connection between the said wire 43 and said stem or rod 3. Electrical communication is then established through the said stem or rod 3, the sleeve 5, carried by said stem or rod 3, the collar 12, the arm 14, the post 15, and either of the contact-brushes 16 or 17 with one of the commutator-sections 10, one of a series of circuit-wires 46, connected with the said commutator-sections, and the various electromagnets 27 and by means of other wires 46', leading from said electromagnets to and connected with the main circuit-wire 42, as shown. Thus when the arm of the vane is rotated by the wind in the manner of the ordinary weather-vane either one of the brushes 16 or 17 established an electrical contact with one of the series of commutator-sections 10, thereby magnetizing the magnetic cores of the respective electromagnet 27 which happens to be in the energized circuit connected with the commutator-section 10 with which contact is made by one of the said brushes 16 or 17. Immediately the proper armature-bar 36 is attracted by the magnetic cores of the energized electromagnet, whereby the said bar 36 is brought from its normally raised position (indicated in Fig. 4) to its horizontal and lowered position. (Represented in Fig. 3 of the drawings.) At the same time the electric motor 28 is operated by the current of electricity passing through it, thereby rotating the arm or bar 32 against the offset 37 of the lowered armature-bar 36, as indicated in said Figs. 2 and 3, and stopping all further rotation of the motor. This movement has also brought the index-hand or pointer 31 directly above the proper symbol on the dial-plate 22, corresponding to the position of the arm of the weather-vane 6 to indicate to the observer within the building the correct direction of the wind. As soon as the direction of said arm of the vane 6 is changed by the wind contact is broken between the brush and the commutator-section 10 and another electrical contact is established between either of the said brushes 16 or 17 with another commutator-section. At the same time the previously-made magnetic contact between the armature-bar 36 and the previously-energized electromagnet is broken, thereby allowing the armature-bar to assume its normally raised position and the motor to assume its rotations, whereby the arm or bar 32 is moved against the offset of another lowered armature-bar 36, which has been actuated by another energized electromagnet, as will be clearly understood. While the brushes 16 and 17 slide against the commutator-sections 10 in either direction, according to the rotary movements of the arm of the vane 6, the direction of rotation of the armature-shaft of the motor 28 and the arm or bar 32 and index-hand or pointer 31 will always be in one and the same direction, as will be clearly evident. As illustrated in the said Fig. 2 of the drawings and as has been hereinabove set forth, it is desirable to employ two contact-brushes 17 and 16, so that at all times a complete electric circuit will be established to indicate the direction of the wind upon the indicator-dial in the building. Thus the two commutator-brushes are spaced the proper distance from each other, so that when the one brush 17 is against a metal commutator-section 10 the other brush 16 is against the porcelain or fibrous main body of the commutator-disk 8, and, vice versa, when the brush 17 is against said disk 8 then the brush 16 is establishing an electric circuit through its contact with one of the commutator-sections 10.

If desired, a make-and-break device 47 may be placed in the circuit-wire 43, as illustrated in Fig. 2, by means of which the electric current from the battery or other source of electrical energy can be interrupted, so that no current will pass through the motor and the electromagnets, and the indicating apparatus within the building thus remains in its inactive position; but as soon as the make-and-break device 47 is actuated by the attendant then the parts of the indicator apparatus are brought into their operative working relation to indicate the direction of the wind.

It will, however, be fully understood that the said make-and-break device 47 is not an absolute necessity and that such device may be dispensed with.

From the above description of my invention it will clearly be evident that a simple and economical system and apparatus for the purpose of indicating upon an indicator located at any desired distance from a weather-vane the direction of the wind has been produced.

I am further aware that changes may be made in the various arrangements and combinations of the devices and parts without departing from the scope of my present invention. Hence I do not limit my invention to the exact arrangements and combinations of the devices and their parts as described in the accompanying specification and as illustrated in the accompanying drawings, nor do I confine myself to the exact details of the construction of the said parts.

Having thus described my invention, what I claim is—

1. In a weather-vane, the combination, of a vane rotatably arranged on a fixed stem, a commutator fixed on said stem, a contact-brush in sliding contact with said commutator, said brush being actuated by the movements of said vane, an indicator located at any distance from said vane, said indicator having an index-hand, a prime mover for actuating said index-hand, electric circuits between said commutator and said indicator, and make-and-break devices located in said electric circuits for arresting the movements of the index-hand of the indicator, substantially as and for the purposes set forth.

2. In a weather-vane, the combination, of a vane rotatably arranged on a fixed stem, a commutator fixed on said stem, a contact-brush in sliding contact with said commutator, said brush being actuated by the movements of said vane, an indicator located at any distance from said vane, an electric motor connected with said indicator, electric circuits between said motor and said commutator, and make-and-break devices located in said electric circuits for controlling the movements of the index-hand of the indicator, substantially as and for the purposes set forth.

3. In a weather-vane, the combination, of a vane rotatably arranged on a fixed stem, a commutator fixed on said stem, a contact-brush in sliding contact with said commutator, said brush being actuated by the movements of said vane, an indicator located at any distance from said vane, an electric motor connected with said indicator, electric circuits between said motor and said commutator, the armature-shaft of said motor, a laterally-extending bar on said armature-shaft, and a laterally-extending index-hand also on said armature-shaft and in alinement directly above said bar, and make-and-break devices located in said electric circuits for arresting the movements of said armature-shaft and the bar connected therewith, substantially as and for the purposes set forth.

4. In a weather-vane, the combination, of a vane rotatably arranged on a fixed stem, a commutator fixed on said stem, a brush in sliding contact with said commutator, said brush being actuated by the movements of said vane, an indicator located at any distance from said vane, an electric motor connected with said indicator, electric circuits between said motor and said commutator, the armature-shaft of said motor, a laterally-extending bar on said armature-shaft, and a laterally-extending index-hand also on said armature-shaft, and in alinement directly above the said bar, a series of electromagnets in said electric circuits, a spring-controlled armature-bar connected with each electromagnet, and a stop on each armature-bar for arresting the movement of the bar connected with the armature-shaft of the motor, substantially as and for the purposes set forth.

5. The combination, with an indicator comprising, a casing, a dial-disk in said casing provided with a centrally-arranged opening, said dial-disk forming with said casing an upper and a lower chamber, an electric motor in said lower chamber, an armature-shaft of said motor extending through the opening in said dial-disk and into said upper chamber, an index-hand in said upper chamber, said index-hand being secured to the said armature-shaft, a stem located outside of the said casing, a weather-vane rotatively supported upon said stem, a commutator fixed on said stem, sliding brushes actuated from said vane and adapted to make electrical contact with said commutator, electric circuits between said commutator and said electric motor, and means in said electric circuits for arresting, from time to time, the motion of said motor, substantially as and for the purposes set forth.

6. The combination with an indicator, comprising, a casing, a dial-disk in said casing provided with a centrally-arranged opening, said dial-disk forming with said casing an upper and a lower chamber, an electric motor in said lower chamber, an armature-shaft of said motor extending through the opening in said dial-disk and into said upper chamber, an index-hand in said upper chamber, said index-hand being secured to the said armature-shaft, a stem located outside of the said casing, a weather-vane rotatively supported upon said stem, a commutator fixed on said stem, sliding brushes actuated from said vane and adapted to make electric circuits between said commutator and said electric motor, a series of electromagnets in said lower chamber and in said electric circuits, a spring-controlled armature-bar connected with each electromagnet, a stop on each armature-bar, and a bar on said armature-shaft adapted to be brought in contact with any one of said stops for arresting the motion of said motor, substantially as and for the purposes set forth.

7. The herein-described electrical indicator, in combination, with a weather-vane, and an electrical controlling mechanism operated from said vane, the said indicator comprising a casing, a dial-disk in said casing providing an upper and a lower chamber in said casing, an electric motor in said lower chamber, an armature-shaft of said motor extending from said motor in the lower chamber into the said upper chamber, a laterally-extending bar in said lower chamber and actuated from said armature-shaft, an index-hand in said upper chamber, a series of normally non-excited electromagnets in said lower chamber, said magnets being adapted to be energized, one at a time, by the action of said vane, a series of posts placed opposite said electromagnets, a spring-controlled armature-bar pivotally connected with each post, each armature-bar being adapted to be attracted by its energized electromagnet, and an offset connected with each armature-bar acting as a stop, when said bar is attracted by its electromagnet, against which said laterally-extending bar which is connected with the armature-shaft of said motor is rotated substantially as and for the purposes set forth.

In testimony that I claim the invention set forth above I have hereunto set my hand this 11th day of October, 1902.

ROBERT WILSON.

Witnesses:
FREDK. C. FRAENTZEL,
GEO. D. RICHARDS.